United States Patent [19]

Hayashi et al.

[11] Patent Number: 5,824,755

[45] Date of Patent: Oct. 20, 1998

[54] PROCESS FOR PRODUCING FLUOROELASTOMERS

[75] Inventors: Kenichi Hayashi; Kenzo Hashimura, both of Miyazaki; Michio Kasahara, Oita; Yukihiro Ikeda, Miyazaki, all of Japan

[73] Assignee: E. I. du Pont de Nemours and Company, Wilmington, Del.

[21] Appl. No.: 805,019

[22] PCT Filed: Mar. 25, 1994

[86] PCT No.: PCT/JP94/00480

§ 371 Date: Nov. 28, 1996

§ 102(e) Date: Nov. 28, 1996

[87] PCT Pub. No.: WO94/22930

PCT Pub. Date: Oct. 13, 1994

Related U.S. Application Data

[63] Continuation of Ser. No. 525,512, Nov. 28, 1995, abandoned.

[30] Foreign Application Priority Data

Mar. 30, 1993 [JP] Japan ..................................... 5-093907

[51] Int. Cl.⁶ ....................................................... C08F 2/00
[52] U.S. Cl. .......................... 526/206; 526/208; 526/216; 526/254

[58] Field of Search ..................................... 526/206, 208, 526/216, 254

[56] References Cited

U.S. PATENT DOCUMENTS 3,553,185  1/1971  Amagi et al. .......................... 260/92.1

FOREIGN PATENT DOCUMENTS

| 0 417 585 | 3/1991  | European Pat. Off. . |
| 3-17106   | 1/1991  | Japan . |
| 3-207701  | 9/1991  | Japan . |
| 3-247608  | 11/1991 | Japan . |
| 3247608   | 11/1991 | Japan . |
| 4-285602  | 10/1992 | Japan . |
| 4285602   | 10/1992 | Japan . |
| 1094558   | 12/1967 | United Kingdom . |

*Primary Examiner*—Joseph L. Schofer
*Assistant Examiner*—N. Sarafin
*Attorney, Agent, or Firm*—Marilyn H. Bromels

[57] ABSTRACT

Fluoroelastomers having copolymerized units of vinylidene fluoride and at least one other fluorinated monomer are prepared in aqueous suspension using an initiator comprising a solution of an oil soluble peroxide in a water-soluble hydrocarbon solvent.

16 Claims, No Drawings

PROCESS FOR PRODUCING FLUOROELASTOMERS

This is a continuation, of application Ser. No. 08/525,512 filed Nov. 28, 1995, now abandoned.

BACKGROUND OF THE INVENTION

This invention pertains to a novel process for the production of a fluoroelastomer.

In particular, it pertains to a process for the production of a fluoroelastomer in which the vulcanized product has excellent heat resistance, oil resistance, and chemical resistance and wherein the Mooney viscosity at the same molecular weight is lower than that of a fluoroelastomer prepared by the emulsion polymerization method of the prior art, the permanent compression set is low, the mold-releasing properties are excellent, and mold contamination is insignificant. The fluoroelastomer is produced by carrying out suspension polymerization in an aqueous medium. It is a safe and efficient process because no ozone layer-depleting chlorofluorocarbon solvents are used and recovery of monomers and solvents is simple.

Fluoroelastomers having excellent heat resistance, oil resistance, and chemical resistance have been used widely for containers, sealing materials, and hoses which are used under severe conditions in the industry. Industrially useful fluoroelastomers include fluoroelastomer dipolymers comprising vinylidene fluoride ($VF_2$) and hexafluoropropylene (HFP) units and fluoroelastomer terpolymers comprising $VF_2$, HFP, and tetrafluoroethylene (TFE) units.

Production of such fluoroelastomers by emulsion polymerization, suspension polymerization, and solution polymerization methods is known in the art. In the suspension polymerization method, polymerization is carried out by dispersing a monomer, or organic solvent with a monomer dissolved therein, in water and using an oil soluble organic peroxide. This method is preferable on an industrial scale because the post treatment is simple, and the fluoroelastomer prepared has excellent thermal stability, workability, and mechanical properties as disclosed in U.S. Pat. Nos. 3,801,552 and 4,985,520.

In the case of suspension polymerization, halogenated hydrocarbons such as, for example, trichlorotrifluoroethane, are used as solvent media. Such halogenated hydrocarbons improve affinity between fluoroelastomer product and monomer, and permit the monomer to be dissolved in the polymer particles. However, after polymerization, it is difficult to recover the solvent, e.g. trichlorotrifluoroethane, and monomer. In addition, halogenated hydrocarbons such as chlorofluorocarbons are alleged to be ozone layer depleting compounds and their use is gradually being curtailed internationally.

In order to prepare a high molecular weight fluoroelastomer, the use of halogenated hydrocarbons having low chain transfer reactivity in the polymerization reaction, such as CFC-113 ($CCl_2FCClF_2$) and HC-141b ($CH_3CFCl_2$), is optimal. Because the chain transfer reactivity of hydrocarbon solvents is generally high, preparation of high molecular weight fluoroelastomers in the latter solvents has not been utilized.

There is a method for carrying out suspension polymerization in the absence of halogenated hydrocarbon by simply adding an oil soluble organic peroxide [Japanese Patent Application Publication Kokai Nos. 3-207,701 (1991) and 3-247,608 (1993)]. In this method, the oil soluble organic peroxide is not diluted. Consequently, the safety at the time of handling, for example in transportation, is a problem, and this method is not practical.

SUMMARY OF THE INVENTION

An objective of the present invention is to provide a safe and efficient process for the production of a fluoroelastomer which uses no ozone layer depleting chlorofluorocarbon type solvent by carrying out suspension polymerization in an aqueous medium. It is a further objective of the invention to provide a process which produces fluoroelastomer product which, when vulcanized, has excellent heat resistance, oil resistance, and chemical resistance, low compression set, excellent mold-releasing properties, and exhibits insignificant mold fouling. Further, in the product so produced the Mooney viscosity at the same molecular weight is lower than that of a fluoroelastomer prepared by the emulsion polymerization method of the prior art.

In particular, the present invention is directed to a suspension process for producing a fluoroelastomer having copolymerized units of vinylidene fluoride monomer and at least one other copolymerizable fluorinated monomer which comprises (A) dispersing said monomers in an aqueous medium containing 0.001–3 parts by weight of a suspension stabilizer per 100 parts of the aqueous medium and 0.001–5 parts by weight of an oil soluble organic peroxide polymerization initiator solution per 100 parts of the aqueous medium; and (B) polymerizing the resultant dispersion at a temperature of 45° C.–70° C.;

wherein said oil soluble organic peroxide polymerization initiator solution consists essentially of 0.1–75 wt. % of an oil soluble organic peroxide in a water-soluble hydrocarbon solvent and said water-soluble hydrocarbon solvent contains no halogen atom and is represented by compounds of the formulas $R_1OH$, $R_2COOR_1$, and $R_1COR_3$, where $R_1$ and $R_3$ are methyl or t-butyl groups, and $R_2$ is hydrogen, a methyl group or a t-butyl group.

In a preferred embodiment, an iodine compound may additionally be present. Suitable iodine compounds are represented by the general formula: $RI_n$, where R is a hydrocarbon group having 1–3 carbon atoms or a saturated or unsaturated fluorohydrocarbon or chlorofluorohydrocarbon group having less than 6 carbon atoms, and n is 1 or 2, and the iodine compound is added in the amount of 0.005–5 parts by weight per 100 parts by weight of the aqueous medium and dispersed.

DETAILED DESCRIPTION OF THE INVENTION

According to the present invention, fluoromonomers copolymerizable with $VF_2$ include, for example, HFP, TFE, and perfluoroalkyl perfluorovinyl ether (PAVE). Specific examples of PAVE include, perfluoromethyl perfluorovinyl ether, perfluoroethyl perfluorovinyl ether, and perfluoropropyl perfluorovinyl ether.

In the case of fluoroelastomer dipolymers comprising $VF_2$ and HFP units and fluoroelastomer terpolymers comprising $VF_2$, HFP, and TFE units, which are examples of the most preferred mode of this invention, the ratio of the $VF_2$ units to the HFP units by weight is generally in the range of 40:60 to 80:20 and preferably in the range of 55:45 to 75:25 in the dipolymer fluoroelastomers or 45:55 to 70:30 in the terpolymer fluoroelastomers. Furthermore, the TFE unit content in the above ternary fluoroelastomers is in the range of 1–35 wt %, preferably 5–25 wt %.

Preferred examples of fluoroelastomers containing PAVE contain, for example, 10–85 mol % of $VF_2$ units, 3–80 mol % TFE units and 2–50 mol % PAVE units.

Fluoroelastomers having the above monomer unit contents exhibit effective rubber elasticity. However, if the ratio is outside the above range, the polymers obtained exhibit resin properties and, consequently, they are not suitable for accomplishing the objectives of this invention.

According to the process of this invention, (1) a monomer mixture of a desired composition (initial monomers charged) is dispersed in an aqueous medium containing a suspension stabilizer in an amount of 0.001–3 parts by weight per 100 parts by weight of the aqueous medium, and, if necessary, an iodine compound represented by the general formula: $RI_n$, where R is a hydrocarbon group having 1–3 carbon atoms or a saturated or unsaturated fluorohydrocarbon or chlorofluorohydrocarbon group having less than 6 carbon atoms, and n is 1 or 2, is also added while stirring mechanically, (2) the liquid temperature is maintained in the range of 45° C.–70° C., preferably 50° C.–60° C., and (3) the suspension polymerization reaction is carried out by adding a polymerization initiator solution prepared by diluting a water soluble organic peroxide in an amount of 0.001–5 parts by weight per 100 parts by weight of the aqueous medium to a concentration of 0.1–75 wt % with a water soluble hydrocarbon solvent wherein hydrocarbon solvent wherein the hydrocarbon contains no halogen atoms and is represented by the general formulas $R_1OH$, $R_2COOR_1$, or $R_1COR_3$, where $R_1$, $R_2$, and $R_3$ are the same as those mentioned above.

The polymerization temperature is maintained in the range of 45° C.–70° C. If it is below 45° C., the rate of polymerization is too slow, while if it is above 70° C., suspended particles of the polymer formed become sticky and are liable to cause blocking. It thus becomes difficult to maintain a stable state of suspension during the polymerization reaction.

The polymerization pressure is in the range of 5–50 $kg/cm^2G$, preferably 8–30 $kg/cm^2G$. The desired polymerization pressure is achieved by adjusting the amount of monomer initially charged, and after the reaction is initiated, the monomer mixture (supplemental monomers) is added in such a way that pressure is maintained at a constant desired level to carry out the polymerization reaction. The polymerization pressure is set in the above range because if it is below 5 $kg/cm^2G$, the monomer concentration in the polymerization reaction system is too low to obtain a satisfactory reaction rate. In addition, the molecular weight does not increase sufficiently. If the pressure is above 50 $kg/cm^2G$, the amount of monomer liquefied is increased, thereby merely increasing the amount of monomer which is not consumed, thereby inviting poor production efficiency.

The amount of polymer formed is approximately equal to the amount of supplemental monomer charged, and is in the range of 10–300 parts by weight of the polymer per 100 parts by weight of the aqueous medium, preferably in the range of 20–250 parts by weight of the polymer.

The degree of polymer formation is set in the above range because if less than 10 parts by weight, productivity is significantly low, while if it is above 300 parts by weight, the solids content becomes too high for satisfactory stirring.

Oil soluble organic peroxides which may be used in this invention include, for example, dialkylperoxydicarbonates, such as diisopropylperoxydicarbonate (IPP), di-sec-butylperoxydicarbonate, di-sec-hexylperoxydicarbonate, di-n-propylperoxydicarbonate, and di-n-butylperoxydicarbonate; peroxyesters, such as tert-butylperoxyisobutyrate and tert-butylperoxypivalate; diacylperoxides, such as dipropionyl peroxide; and di(perfluoroacyl)peroxides or di(chlorofluoroacyl)peroxides such as di(perfluoropropionyl)peroxide and di(trichloro-octafluorohexanoyl)peroxide. The use of dialkyl peroxydicarbonates is preferably, and the use of IPP is most preferred. These oil soluble organic peroxides may be used alone or as a mixture of two or more types. The amount to be used is selected generally in the range of 0.001–5 parts by weight per 100 parts by weight of the aqueous medium, preferably 0.01–3 parts by weight.

Oil soluble organic peroxides are associated with a risk of explosion when heated or on impact, and, consequently, they are difficult to transport unless they are diluted with a solvent. Previously, such organic peroxides were diluted with halogenated hydrocarbon solvents and used in suspension polymerization to prepare fluoroelastomers. It was believed that use of a hydrocarbon as a diluent was impractical because radical abstraction of hydrogen atoms from the solvent at the time of polymerization would occur, rendering it difficult to obtain a high molecular weight product and depressing the polymerization reaction rate. However, if oil soluble organic peroxides are diluted with a water soluble hydrocarbon solvent containing no halogen atoms, represented by the following general formulas $R_1OH$, $R_2COOR_1$, or $R_1COR_3$, where $R_1$ and $R_3$ are methyl or t-butyl groups, and $R_2$ is hydrogen, a methyl group or a t-butyl group, it is possible to produce a fluoroelastomer of low molecular weight to high molecular weight safely and efficiently. At the same time, the recovery of monomers and solvent is not difficult. The hydrocarbon solvents of the present invention do not have substantial adverse effects on the polymerization reaction because the chain transfer reactivity of these hydrocarbon solvents is relatively small. At the same time, they are soluble in the aqueous medium. Further, only trace amounts are contained in micelles comprised of the monomers and oil soluble organic peroxide in which the polymerization reaction occurs. Also, the solvent or monomers diffuse into the polymer formed with difficulty and consequently, the recovery of the solvent and monomers is not difficult.

Specific examples of water-soluble, non-halogenated hydrocarbon solvents of this invention are methanol, tert-butyl alcohol, methyl formate, tert-butyl formate, methyl acetate, tert-butyl acetate, methyl pivalate, tert-butyl pivalate, acetone, methyl tert-butyl ketone, and di-tert-butyl ketone. The use of methanol, tert-butyl alcohol, methyl acetate, or tert-butyl acetate is preferable and methyl acetate or tert-butyl acetate are most preferred. These solvents may be used alone or as a combination of two or more types. The solvent is used to dilute an oil soluble organic peroxide to a concentration of 0.1–75 wt %, preferably 1–60 wt % . If the concentration is over 75 wt %, the organic peroxide concentration is too high for safe transportation. On the other hand, if it is below 0.1 wt %, the concentration is so low that the amount of solvent to be recovered becomes undesirably high.

When producing peroxide-curable fluoroelastomer according to the process of the present invention, it is particularly useful to introduce an iodine compound represented by the general formula $RI_n$, where R is a hydrocarbon group having 1–3 carbon atoms or a saturated or unsaturated fluorohydrocarbon or chlorofluorohydrocarbon group having less than 6 carbon atoms, and n is 1 or 2. The iodine compound introduces sites in the polymer which can take part in crosslinking reactions. In the formula, n must be 1 or 2 because if n were 3, the fluoroelastomer produced would have a three-dimensional structure providing poor workability. The iodine compound is selected from those which do not decompose or lose their activity under the polymerization conditions used. Specific iodine compounds include monoiodomethane, is diiodomethane, 1-iodoethane, 1,2-diiodoethane, 1-iodo-n-propane, isopropyl iodide, 1,3-diiodo-n-propane, 1,4-diiodoperfluoro-n-butane, 1,6-diiodofluoro-n-hexane, and 1,5-diiodo-2,4-dichloroperfluoro-n-pentane. The use of diiodomethane is most preferred because of its polymerization reactivity, vulcanization reactivity, and availability. The iodine compounds may be used alone or as a combination of two or more types.

In the case of copolymerization of $VF_2$ and a copolymerizable fluoroolefin in the presence of an iodine compound represented by the general formula, the carbon iodine bond of the iodine compound reacts with the radical formed, conventional telomerization occurs, and an iodine atom is introduced at the polymer end. The amount of iodine compound used is in the range of 0.005–5 parts by weight, preferably 0.05–3 parts by weight.

Suspension stabilizers useful in the present invention include, for example, methyl cellulose, carboxymethyl cellulose, bentonite, talc, and diatomaceous earth. Methyl cellulose is preferred. These suspension stabilizers may be used alone or as a combination of two or more types. The amount utilized is generally in the range of 0.001–3 parts by weight, preferably 0.01–1 part by weight per 100 parts by weight of the aqueous medium.

Polymerization times in the range of from 3–50 hours, as in convention fluoroelastomer preparations, are employed in this invention. The amount of fluoroelastomer formed is roughly equal to the amount of monomer charged and the composition of monomer charged is roughly the same as that of the fluoroelastomer to be prepared.

The monomer composition of the initial charge and that of supplemental monomer added are determined by gas chromatography. The monomer composition in the fluoroelastomer prepared is determined by dissolving the fluoroelastomer in acetone and carrying out $^{19}F$-NMR analysis.

The fluoroelastomers prepared by this invention are generally vulcanized and molded before use. Suitable vulcanization methods employ polyol and polyamine compounds as curatives. Vulcanization with a polyol compound is especially advantageous because compression set resistance is improved further. Fluoroelastomers prepared using an iodine compound of this invention can be vulcanized with a polyol or polyamine compound but peroxide vulcanization using an organic peroxide is also possible. When peroxide curatives are used, resistance to chemicals such as acids or bases is markedly improved.

When vulcanization using a polyol compound is employed, the method involves mixing a fluoroelastomer of the invention with (a) a polyhydroxy aromatic compound, (b) a vulcanization accelerator, (c) divalent metal hydroxide and/or divalent metal oxide, and, if necessary, other components, and kneading the mixture on a rubber mill or in a Banbury mixer. The resultant mixture is then placed in a mold, pressurized to effect primary vulcanization (press cure) and, subsequently, a secondary vulcanization (post cure) is carried out. In general, the press cure is effected at 100° C.–200° C. at 20–100 kg/cm$^2$ for 10–180 minutes. The post cure is carried out at 150° C.–300° C. for 0–30 hours. Furthermore, the post cure step may be omitted in some cases.

Examples of component (a) polyhydroxy aromatic compounds include bisphenol AF, bisphenol A, bisphenol S, dihydroxybenzophenone, hydroquinone, 4,4'-thiodiphenol, and their metal salts. Bisphenol AF is most preferred. The amount used is generally in the range of 0.1–10 parts by weight, preferably 0.6–5 parts by weight per 100 parts by weight of the fluoroelastomer. The particular component (a) range is selected because if less than 0.1 part by weight is present, vulcanization is incomplete, while, on the other hand, if more than 10 parts by weight is used, elasticity is sacrificed. The polyhydroxy aromatic compounds may be used alone or as a combination of two or more types.

Component (b) vulcanization accelerators include phosphonium salts, ammonium salts, iminium salts, sulfonium salts, and aminophosphine derivatives. Specific examples include benzyltriphenylphosphonium chloride, methyltriphenylphosphoniummethylmethane phosphonate, tetrabutylammonium fluoride, tetrabutylammonium bromide, 8-benzyl-1,8-diazabicyclo(5,4,0)-undecenonium chloride, and bis(benzyldiphenylphosphine)iminium chloride. The use of benzyltriphenylphosphonium chloride, 8-benzyl-1,8-diazabicyclo(5,4,0)-undecenonium chloride, and bis (benzyldiphenylphosphine)iminium chloride is preferable. The amount employed is generally in the range of 0.05–2 parts by weight, preferably 0.1–1 part by weight, per 100 parts by weight of the fluoroelastomer. If component (b) is present at levels below 0.05 part by weight, the vulcanization rate is too slow. If it is present in amounts above 2 parts by weight, the compression set becomes unacceptably poor. The accelerators may be used alone or as a combination of 2 or more types.

Component (c) divalent metal hydroxides and/or divalent metal oxides include, for example, oxides and hydroxides of magnesium, calcium, zinc, and lead. The use of oxides and hydroxides of magnesium and calcium is preferred. The amount compounded is generally in the range of 1–30 parts by weight, preferably 2–20 parts by weight per 100 parts by weight of the fluoroelastomer. The particular component (c) range is selected because if less than 1 part by weight is used, vulcanization is not complete. On the other hand, if more than 30 parts of component (c) is present, the compression set becomes poor. The component (c) compounds may be used alone or as a combination of 2 or more types.

In addition, if necessary, other components, for example, fillers such as carbon black, Austin black, graphite, silica, clay, diatomaceous earth, talc, wollastonite, calcium carbonate, calcium silicate, calcium fluoride, and barium sulfate; processing aides such as higher fatty acid esters, fatty acid calcium salts, fatty acidamides, low molecular weight polyethylene, silicone oil, silicone grease, stearic acid, sodium stearate, calcium stearate, magnesium stearate, aluminum stearate, and zinc stearate; coloring agents such as titanium white and iron red may be used as compounding additives. The amount of such filler compounded is generally in the range of 0.1–100 parts by weight, preferably 1–60 parts by weight, per 100 parts by weight of the fluoroelastomer. This range is selected because if the filler is present in amounts of less than 0.1 part by weight, there is no effect, while, on the other hand, if greater than 100 parts by weight are used, elasticity is sacrificed. The amount of processing aid compounded is generally less than 10 parts by weight, preferably less than 5 parts by weight, per 100 parts by weight of the fluoroelastomer. If the amount used is above the limit, heat resistance is adversely affected. The amount of a coloring agent compounded is generally less than 50 parts by weight, preferably less than 30 parts by weight per 100 parts by weight of the fluoroelastomer. If greater than 50 parts by weight is used, compression set suffers.

In the case of diaphragm applications, for example elongation is more critical than compression set resistance. Thus, vulcanization with a polyamine compound is preferably employed. The same vulcanization conditions as those employed in the vulcanization methods utilizing polyol compounds may be used. Polyamine vulcanization is carried out with the above (a) polyhydroxyaromatic compounds and instead of a (b) vulcanization accelerator, a (d) polyamine compound selected from the group of, for example, hexamethylenediamine, hexamethylenediamine carbamate, ethylenediamine carbamate, N,N-dicinnamylidene-1,6-hexamethylenediamine, and 4,4'-bis(aminocyclohexyl) methane carbamate, is employed. The amount of the component (d) compounded is generally in the range of 0.1–10 parts by weight, preferably 0.5–5 parts by weight per 100 parts by weight of the fluoroelastomer. The particular range of component (d) is selected because if less than 0.1 part by weight is used, vulcanization of molded goods is incomplete, while, on the other hand, if greater than 10 parts by weight is used, elasticity is compromised. The polyamine compounds may be used singly or in combinations of two or more types.

The peroxide vulcanization method can be exemplified as follows. To a fluoroelastomer of this invention is added (a) organic peroxide, (f) polyfunctional unsaturated compound, if necessary, one of the above-described (c) divalent metal hydroxides and/or divalent metal oxides and any other components. The mixture is kneaded using a rubber mill or Banbury mixer. Subsequently, the mixture is placed in a mold, pressurized to effect primary vulcanization (press cure), and then a secondary vulcanization (post cure) is carried out. In general, the first vulcanization is effected at 100° C.–200° C. under 20–300 kg/cm$^2$ for 5–30 minutes, and the post cure is carried out at 100° C.–200° C. for 0–30 hours. The post cure may be omitted in some cases.

Component (e) organic peroxides suitable for use include organic peroxides which generate peroxide radicals under the vulcanization conditions, such as 1,1-bis(t-butylperoxy)-3,5,5-trimethylcyclohexane; 1,1-bis(t-butylperoxy)cyclohexane; 2,2-bis(t-butylperoxy)octane; n-butyl-4,4-bis(t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; α, α'-bis(t-butylperoxy-m-isopropyl)benzene; 2,5-dimethyl-2,5-di(t-butylperoxy)hexane; 2,5-dimethyl-2,5-di(t-butylperoxy)hexene-3; benzoyl peroxide, t-butylperoxybenzene; 2,5-dimethyl-2,5-di(benzoylperoxy)hexane; t-butylperoxymaleic acid; and t-butylperoxyisopropylcarbonate. Preferred examples of the component (e) peroxides include 2,5-dimethyl-2,5-di(t-butylperoxy)hexane, dicumyl peroxide, and α, α'-bis(t-butylperoxy-m-isopropyl)benzene. The amount compounded is generally in the range of 0.05–5 parts by weight, preferably in the range of 0.1–3 parts by weight per 100 parts by weight of the fluoroelastomer. The particular component (c) range is selected because if the peroxide is present in an amount of less than 0.05 parts by weight, the vulcanization rate is insufficient and causes poor mold release. On the other hand, if the peroxide is present in amounts of greater than 5 parts by weight, the compression set becomes unacceptably high. In addition, the organic peroxides may be used singly or in combinations of two or more types.

Specific examples of the component (f) polyfunctional unsaturated compound are triallyl cyanurate, trimethacryl isocyanurate, triallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, and N,N-diallylacrylamide. The particular component (f) range is selected because if component (f) is present in amounts less than 0.1 part by weight, crosslink density is unacceptable. On the other hand, if component (f) is present in amounts above 10 parts by weight, surface blooming of component (f) occurs during molding, resulting in poor mold characteristics. The preferable range of component (f) is 0.2–6 parts by weight per 100 parts fluoroelastomer. The component (f) polyfunctional unsaturated compounds may be used singly or as a combination of two or more types.

The shrinkage of the fluoroelastomers of this invention which occurs during milling has been found to be low.

The vulcanized product prepared as described above exhibits low tensile stress at 100% elongation, low hardness, good elongation, and low compression set, thereby exhibiting elastomeric characteristics.

By carrying out vulcanization as described above, it is possible to prepare various molded packings and gaskets such as o-rings, V-packing, U-packing, Y-packing, D-rings, triangle rings, T-rings, X-rings, and rubber valve seats, butterfly valves, stem valves, oil seals, SF class engine oil resistant moldings, SG class engine oil resistant moldings, fuel hose, filler hose, in-tank hose, thermal contraction tubes, wet friction materials, electric wire covering, piezo-electric material, and chimney duct joint bellows.

EXAMPLES

The invention is further illustrated by, but is not limited to, the following examples.

Various physical properties of the fluoroelastomers of this invention were determined according to the following methods.

(1) The limiting viscosity [η] was determined by dissolving a sample of the fluoroelastomer in methyl ethyl ketone to obtain a 0.1 g/100 ml solution, which was used in a capillary viscometer in measurements at 35° C.

(2) The molecular weight distribution was measured using liquid chromatography. A Model HLC-8020 chromatograph [manufactured by Toso (K.K.)] was used, column: KF-80M (2 columns) plus KF-800P (precolumn) [manufactured by Showa Denko K.K.)], integrator: Model AS-8010 [manufactured by Toso (K.K.)], development solvent: tetrahydrofuran, concentration 0.1 wt %, temperature: 35° C., and standard polymers for molecular weight working curve preparation: various polystyrene simple dispersion [manufactured by Toso (K.K.), $M_w/M_n$ of about 1.2 (max)].

(3) The Mooney viscosity was determined according to the method of JIS-K6300 by using a Kamishima Seisakusho rotary viscometer, Model VR-103ST with and L type rotor under conditions of 121° C., preheating time of one minute and rotor operation time of 10 minutes.

(4) The hardness of vulcanized products was measured according to the method of JIS-A, and the tensile characteristics such as tensile stress, tensile strength, and tensile elongation were measured according to the method of JIS-K6301.

(5) The compression set of the vulcanized products was measured according to the method of JIS-6301 by using and o-ring P-24 defined in JIS-B2401, temperature of 200° C., and a time of 72 hours.

Example 1

A 15-liter autoclave, equipped with an electromagnetic stirrer was blanketed with nitrogen gas. Subsequently, a solution prepared by dissolving 3.6 g of methyl cellulose (viscosity of 50 cp) as an emulsion stabilizer in 4760 g of deoxygenated pure water was added under vacuum to the autoclave. The stirrer speed was 600 rpm and the temperature was maintained at 50° C. A monomer mixture comprising 29.5 wt % of $VF_2$, 64.5 wt % HFP, and 6.0 wt % TFE was added as an initial monomer mixture until the pressure reached 26.5 kg/cm$^2$G. A polymerization initiator solution was then prepared by dissolving 4.3 g of the oil soluble organic peroxide IPP in 50.6 g of methyl acetate (a water soluble hydrocarbon solvent). This solution was added to the autoclave under pressure and after the polymerization was initiated, the pressure was reduced to 25.5 kg/cm$^2$G and a monomer mixture comprising 52.7 wt % $VF_2$, 25.5 wt % HFP, and 21.8 wt % TFE was added as a supplemental monomer mixture until the pressure reached 26.5 kg/cm$^2$G. The polymerization reaction was carried out in a continuous manner for 6 hours by repeating these procedures. After completion of the polymerization reaction, the remaining monomer mixture was discharged, the suspension was dewatered in a centrifuge, and the solids obtained were thoroughly washed with water and dried at 100° C. under vacuum to obtain about 6 kg of an elastomer. The fluoroelastomer thus prepared was analyzed for monomer ratio using $^{19}$F-NMR and the $VF_2$ content was determined to be 54.6 wt %, the HFP content was determined to be 25.1 wt %, and the TFE content was determined to be 20.3 wt %. In addition, the limiting viscosity [η] of the fluoroelastomer was 258 ml/g and the Mooney viscosity $ML_{1+10}$(121° C.) was 120.

One hundred parts by weight of the fluoroelastomer were milled on a rubber mill with 20 parts of Cancarb medium thermal carbon black (Thermax N-990), 6 parts by weight of "Calbit" calcium hydroxide (Ohmi Chemical), 3 parts by weight "Kyowamag" high activity magnesium oxide (Kyowa Chemical Industries), 2 parts by weight of bisphenol AF and 0.3 parts by weight of bis (benzyldiphenylphosphine)iminium chloride. The milled product was allowed to age by standing overnight.

After milling, the mixture was placed in molds and press cured at 177° C. for 30 minutes to obtain a 2 mm thick sheet and o-ring. The cured polymer was removed from the molds and heated in a hot air convection oven at 232° C. for 24 hours to post cure the samples. The cured polymer was tested and the physical properties are shown in Table 1.

Comparative Example 1

The atmosphere of a 15 liter autoclave equipped with an electromagnetic stirrer was substituted with nitrogen by three times repeating the process of vacuum evacuation followed by feeding in nitrogen. A solution of 4.64 g of methyl cellulose (viscosity 50 cp) dissolved in 4640 g of deoxygenated pure water was added to the autoclave under vacuum with stirring at 600 rpm while maintaining the autoclave temperature at 50° C. A monomer mixture comprising 5 28.9 wt % $VF_2$, 65.2 wt % HFP, and 5.9 wt % TFE was added as an initial monomer mixture until the pressure reached 20 kg/cm$^2$G. A polymerization initiator solution prepared by dissolving 8.6 g of the oil soluble organic peroxide IPP in 85.4 g of CFC R-141b ($CH_3CFCl_2$) was added under pressure to initiate the polymerization reaction. After polymerization was initiated, the pressure was reduced to 19.5 kg/cm$^2$G and a monomer mixture comprising 52.7 wt % $VF_2$, 25.5 wt % HFP, and 21.8 wt. TFE was added as a supplemental monomer mixture until the pressure reached 20 kg/cm$^2$G. The polymerization reaction was carried out in a continuous manner for 5 hours with pressure being repeatedly boosted to 20 kg/cm$^2$G by addition of supplemental monomer when the pressure fell to 19.5 kg/cm$^2$G. After the polymerization reaction was complete, the remaining monomer mixture was discharged, the suspension was dewatered in a centrifuge and the solids obtained were thoroughly washed with water and dried at 100° C. under vacuum to obtain about 4.5 kg of an elastomer. The fluoroelastomer product was analyzed for monomer ratio using $^{19}$F-NMR. The content of $VF_2$ units was 52.6 wt %, the HFP content was 26.5 wt % and the TFE content was 20.9 wt %. The limiting viscosity [η] of the fluoroelastomer was 257 ml/g and the Mooney viscosity $ML_{1+10}$(121° C.) was 120. The product was vulcanized using the same method as described for Example 1. The physical properties of the cured products are shown in Table 1. The results obtained showed the same polymer properties and vulcanized properties as those obtained in Example 1. However, the solvent R-141b used for the catalyst is ozone-destroying and is not suitable for environmental reasons.

Example 2

The atmosphere of a 15 liter autoclave equipped with an electromagnetic stirrer was substituted with nitrogen by three times repeating the process of vacuum evacuation followed by feeding in nitrogen. A solution of 0.3 g of methyl cellulose (viscosity 50 cp) dissolved in 360 g of deoxygenated pure water was added to the autoclave under vacuum with stirring at 600 rpm while maintaining the autoclave temperature at 50° C. A monomer mixture comprising 29.9 wt % $VF_2$, and 70.1 wt % HFP was added as an initial monomer mixture until the pressure reached 13 kg/cm$^2$G. A polymerization initiator solution prepared by dissolving 1.8 g of the oil soluble organic peroxide IPP in 4.0 g of methyl acetate was added under pressure to initiate the polymerization reaction. After polymerization was initiated, the pressure was reduced to 12 kg/cm$^2$G and a monomer mixture comprising 63.1 wt % $VF_2$, and 36.9 wt % HFP was added as a supplemental monomer mixture until the pressure reached 13 kg/cm$^2$G. The polymerization reaction was carried out in a continuous manner for 13 hours with pressure being repeatedly boosted to 13 kg/cm$^2$G by addition of supplemental monomer when the pressure fell to 12 kg/cm$^2$G. After the polymerization reaction was complete, the remaining monomer mixture was discharged, the suspension was dewatered in a centrifuge and the solids obtained were thoroughly washed with water and dried at 100° C. under vacuum to obtain about 300 g of an elastomer. The fluoroelastomer product was analyzed for monomer ratio using $^{19}$F-NMR. The content of $VF_2$ units was 65.3 wt %, and the HFP content was 34.7 wt %. The limiting viscosity [η] of the fluoroelastomer was 90 ml/g Example 3

The same method as that used in Example 2 was repeated except that 3.7 g of t-butyl acetate instead of 4.0 g of methyl acetate was used, and the polymerization time was about 14 hours. The yield of the fluoroelastomer product was about 340 g, the monomer content of the polymer was 63.2 wt %

VF$_2$ units and 34.7 wt % HFP units, and the limiting viscosity [η] of the fluoroelastomer was 92 ml/g.

Comparative Example 2

The same method as that used in Example 2 was repeated except that 5.7 g of perchloroethylene instead of 4.0 g of methyl acetate was used. The yield of the fluoroelastomer prepared was about 3 g, the monomer content of the polymer was 63.5 wt % VF$_2$ units and 36.5 wt % HFP units, and the limiting viscosity [η] of the fluoroelastomer was 10 ml/g. The yield was extremely low compared with that of Example 2 or 3, and the viscosity [η] was extremely low.

Comparative Example 3

The same method as used in Comparative Example 1 was repeated under the conditions shown in Table 2. The properties of the polymer prepared are shown in Table 2. The solvent R-225cb used in the example is ozone-destroying and it is not environmentally suitable.

Example 4

A 15 liter autoclave having an electromagnetic stirrer was flushed three times with nitrogen gas under vacuum. A solution of 4.1 g of methyl cellulose (viscosity 50 cp) dissolved in 5.4 kg of deoxygenated pure water was added to the autoclave under vacuum with stirring at 600 rpm while maintaining the autoclave temperature at 50° C. A monomer mixture comprising 15.6 wt % VF$_2$, 78.2 wt % HFP, and 6.2 wt % TFE was added as an initial monomer mixture until the pressure reached 24 kg/cm$^2$G. A polymerization initiator solution prepared by dissolving 4.3 g of the oil soluble organic peroxide IPP in 50.6 g of methyl acetate along with 27.7 g diiodomethane was added under pressure to initiate the polymerization reaction. After polymerization was initiated, the pressure was reduced to 23 kg/cm$^2$G and a monomer mixture comprising 47.7 wt % VF$_2$, 31.4 wt % HFP, and 20.9 wt % TFE was added as a supplemental monomer mixture until the pressure reached 24 kg/cm$^2$G. The polymerization reaction was carried out in a continuous manner for 14.5 hours by repeating these procedures. After the polymerization reaction was complete, the remaining monomer mixture was discharged, the suspension was dewatered in a centrifuge and the solids obtained were thoroughly washed with water and dried at 100° C. under vacuum to obtain about 5 kg of an elastomer. The fluoroelastomer product was analyzed for monomer ratio using $^{19}$F-NMR. The content of VF$_2$ units was 46.3 wt %, the HFP content was 32.5 wt %, and the TFE content was 21.2 wt %. The limiting viscosity [η] of the fluoroelastomer was 50 ml/g and the Mooney viscosity ML$_{1+10}$(121° C.) was 7.

One hundred parts by weight of the fluoroelastomer was milled on a rubber mill with 20 parts of MT carbon black (Thermax N-990) and 3 parts by weight "Kyowamag" high activity magnesium oxide (Kyowa Chemical Industries). Subsequently, 4 parts by weight of triallyl isocyanurate (TAIC) from Nippon Chemical Co. and 3.75 parts by weight of 2,5-dimethyl-2,5-di(t-butylperoxy)hexane ("Perhexa 25B-40", peroxide content of 40 wt %, available from Nippon Oil and Fat Co.) was milled into the polymer mixture. The milled product was allowed to age by standing overnight.

After milling, the mixture was placed in molds and press cured at 177° C. for 30 minutes to obtain a 2 mm thick sheet and o-ring. The cured polymer was removed from the molds and heated in a hot air convection oven at 180° C. for 4 hours to post cure the samples. The cured polymer was tested and the physical properties are shown in Table I.

Comparative Example 4

The same method as that used in Example 4 was employed except that the polymerization initiator used was different. The polymer properties of the fluoroelastomer product and the cured polymer properties are shown in Table I. The results obtained are comparable to those obtained in Example 4, but the solvent used was ozone destroying and is harmful to the environment.

Example 5

The atmosphere of a 10 liter autoclave equipped with an electromagnetic stirrer was substituted with nitrogen by three times repeating the process of vacuum evacuation followed by feeding in nitrogen. A solution of 4.16 g of methyl cellulose (viscosity 50 cp) dissolved in 4160 kg of deoxygenated pure water was added to the autoclave under vacuum with stirring at 600 rpm while maintaining the autoclave temperature at 50° C. A monomer mixture comprising 28.7 wt % VF$_2$, 65.6 wt % HFP, and 5.7 wt % TFE was added as an initial monomer mixture until the pressure reached 20 kg/cm$^2$G. A polymerization initiator solution prepared by dissolving 10.3 g of the oil soluble organic peroxide IPP in 37.0 g of methyl acetate was added under pressure to initiate the polymerization reaction. After polymerization was initiated, the pressure was reduced to 19.5 kg/cm$^2$G and a monomer mixture comprising 52.8 wt % VF$_2$, 25.4 wt % HFP, and 21.8 wt % TFE was added as a supplemental monomer mixture until the pressure reached 20 kg/cm$^2$G. The polymerization reaction was carried out in a continuous manner for 4.5 hours by boosting the pressure to 20 kg/cm$^2$G by addition of supplemental monomer when the pressure fell to 19.5 kg/cm$^2$G. After the polymerization reaction was complete, the remaining monomer mixture was discharged, the suspension was dewatered in a centrifuge and the solids obtained were thoroughly washed with water and dried at 100° C. under vacuum to obtain about 5 kg of an elastomer. The fluoroelastomer product was found to contain 51.7 wt % VF$_2$, 28.0 wt % HFP, 20.3 wt % TFE units. The limiting viscosity [η] of the fluoroelastomer was 120 ml/g and the number average molecular weight M$_n$ was 11.1×10$^4$.

The fluoroelastomer product was cured using the same method as used in Example 1 to obtain a cured product whose properties were measured. The results obtained for polymer properties are shown in Table 4, and the properties of the cured products are shown in Table 5.

Examples 6–9 and Comparative Examples 5–10

The same method as used in Example 5 was used except that the methyl acetate was substituted with the solvents shown in Table 4 to dilute the IPP. The polymer properties measured are shown in Table 4. The same curing method as used in Example 1 was used for the polymers prepared in Examples 6–9 to obtain cured molded products which were tested. The properties of these cured molded products are shown in Table 5.

Comparative Example 11

The same method as that used in Example 5 was used except that no solvent at all was employed. Polymer properties are shown in Table 4. The same curing process as that used in Example 1 was used to obtain cured, molded products of the fluoroelastomer. The properties of the cured, molded products are shown in Table 5. The cured, molded products of Comparative Example 11 were comparable to those prepared in Examples 5–9 with respect to their physical properties. The procedures used are those suitable for bench scale handling of IPP without solvent dilution, but if scaled up to an industrial scale, the decomposition of the peroxide becomes a problem, and consequently, the method is not practical.

TABLE 1

|  | Example (PE) or comparative example (CE) | | | |
|---|---|---|---|---|
|  | PE 1 | CE 1 | PE 4 | CE 4 |
| Polymer characteristics | | | | |
| Composition | | | | |
| $VF_2$ unit | 54.6 | 52.6 | 46.3 | 47.5 |
| HFP unit | 25.1 | 26.5 | 32.5 | 31.4 |
| TFE unit (wt %) | 20.3 | 20.9 | 21.2 | 21.1 |
| $[\eta]$ (ml/g) | 258 | 257 | 50 | 50 |
| Number average m.w. Mn (× $10_4$) | 25.6 | 28.5 | 4.2 | 4.8 |
| Weight average m.w. Mw (× $10_4$) | 90.2 | 96.7 | 8.6 | 9.6 |
| Mooney viscosity $ML_{1+10}$ (121° C.) | 120 | 120 | 7 | 9 |
| Vulcanized product characteristics | | | | |
| Hardness (pts) | 68 | 68 | 73 | 73 |
| 100% Tensile stress (kgf/cm$^2$) | 43 | 45 | 52 | 49 |
| Tensile strength (kgf/cm$^2$) | 149 | 148 | 212 | 211 |
| Elongation (%) | 245 | 245 | 300 | 305 |
| Compression set (%) | 9 | 9 | 24 | 22 |
| Ozone destruction coefficient of the solvent used for the initiator[1] | 0 | 0.11 | 0 | 0.8 |

[1]Ozone destruction coefficient cited from UNEP Synthesis Report 1991.

TABLE 2

|  |  | Comparative Example No. 3 |
|---|---|---|
| Polymerization conditions | | |
| Initally charged monomer composition | | |
| $VF_2$ | | 30.0 |
| HFP (wt %) | | 70.0 |
| Supplemental monomer composition | | |
| $VF_2$ | | 63.1 |
| HFP (wt %) | | 36.9 |
| Polymerization temperature (°C.) | | 50 |
| Polymerization pressure (kg/cm$^2$ G) | | 13 |
| Amount of pure water charged (kg) | | 5.4 |

TABLE 2-continued

|  |  | Comparative Example No. 3 |
|---|---|---|
| Methylcellulose (g) | | 5.4 |
| Polymerization initiator solution | IPP[1] (g) | 26 |
|  | Solvent (g) | R-225cb[2] |
|  | Ozone destruction coeff.[3] | 0.025 |
| Polymerization time (hr) | | 13 |
| Elastomer yield (g) | | 5,100 |
| $[\eta]$ (ml/g) | | 85 |
| Polymer composition | | |
| $VF_2$ unit | | 62.9 |
| HFP unit (wt %) | | 37.1 |
| Mooney viscosity $ML_{1+10}$ (121° C.) | | 44 |

[1]IPP: diisopropyl peroxydicarbonate
[2]R-225cb: $CClF_2CF_2CHClF$
[3]Ozone destruction coefficient cited from UNEP Synthesis Report 1991.

TABLE 3

|  | EXAMPLE 4 | COMPARATIVE EXAMPLE 4 |
|---|---|---|
| Polymerization conditions | | |
| Initally charged monomer composition | | |
| $VF_2$ | 15.6 | 15.6 |
| HFP | 78.2 | 78.2 |
| TFE (wt %) | 6.2 | 6.2 |
| Supplemental monomer composition | | |
| $VF_2$ | 47.7 | 47.7 |
| HFP | 31.4 | 31.4 |
| TFE (wt %) | 20.9 | 20.09 |
| Polymerization temperature (°C.) | 50 | 50 |
| Polymerization pressure (kg/cm$^2$ G) | 24 | 24 |
| Amount of pure water charged (kg) | 5.4 | 5.4 |
| Methyl Cellulose) | 4.1 | 4.1 |
| Diiodomethane (g) | 27.7 | 27.7 |
| Polymerization initiator solution | IPP[1] (g) | 4.3 | 4.3 |
|  | Solvent (g) | Methyl acetate | R-113[2] |
|  |  | 50.6 | 86 |
|  | Ozone destruction coeff[3] | 0 | 0.8 |
| Polymerization time (hr) | 14.5 | 13 |
| Elastomer yield (g) | About 5 | About 5 |

[1]IPP: diisopropyl peroxydicarbonate
[2]R-113: $CCl_2FCClF_2$
[3]Ozone destruction coefficient cited from UNEP Synthesis Report 1991.

TABLE 4

| | Solvent | | | | Polymer characteristics | | |
|---|---|---|---|---|---|---|---|
| | Type | Amount (g) | Initiator solution concn. (wt %) | Yield (kg) | Limit viscosity [η] (ml/g) | Number avg. molecular wt. Mn | Composition VF$_2$/HFP/TFE (wt %) |
| PE 5 | Methyl acetate | 37 | 21.8 | About 2.5 | 120 | 11.1 × 10$^4$ | 51.7/28.0/20.3 |
| PE 6 | Methyl formate | 30 | 25.6 | About 2.2 | 114 | 8.9 × 10$^4$ | 52.4/27.1/20.5 |
| PE 7 | Methyl alcohol | 16 | 39.2 | About 2.5 | 171 | 14.0 × 10$^4$ | 52.7/26.8/20.5 |
| PE 8 | t-Butyl alcohol | 37 | 21.8 | About 3.3 | 176 | 14.4 × 10$^4$ | 53.5/25.9/20.6 |
| PE 9 | Acetone | 29 | 26.2 | About 2.0 | 91 | 8.1 × 10$^4$ | 52.0/27.6.20.4 |
| CE 5 | Ethyl acetate | 44 | 19.0 | About 1.4 | 54 | 3.4 × 10$^4$ | 52.4/27.1/20.5 |
| CE 6 | Ethyl alcohol | 23 | 30.9 | ABout 1.1 | 71 | 5.5 × 10$^4$ | 51.0/27.6/21.4 |
| CE 7 | sec-Butyl alcohol | 37 | 21.8 | About 0.1 | 23 | 0.9 × 10$^4$ | 51.1/30.9/18.0 |
| CE 8 | Methyl ethyl ketone | 36 | 22.2 | About 0.0 | 36 | 0.8 × 10$^4$ | 52.6/29.6/17.8 |
| CE 9 | Methyl t-butyl ether | 44 | 19.0 | About 0.1 | 21 | 0.6 × 10$^4$ | 49.4/31.6/19.0 |
| CE 10 | Benzene | 39 | 20.9 | | No polymerization | | |
| CE 11 | None | — | — | About 2.6 | 192 | 17.3 × 10$^4$ | 54.1/26.6/19.3 |

PE: practical example, CE: comparative example

TABLE 5

| | Solvent | Hardness (pts) | 100% Tensile Stress (kgf/cm2) | Tensile Strength (kgf/cm2) | Elongation (%) | Compression Set (%) |
|---|---|---|---|---|---|---|
| PE 5 | Methyl acetate | 57 | 39 | 159 | 250 | 13 |
| PE 6 | Methyl formate | 67 | 38 | 160 | 260 | 13 |
| PE 7 | Methyl alcohol | 68 | 42 | 165 | 245 | 11 |
| PE 8 | t-Butyl alcohol | 68 | 44 | 165 | 245 | 14 |
| PE 9 | Acetone | 68 | 40 | 149 | 245 | 16 |
| CE 11 | None | 68 | 45 | 167 | 255 | 13 |

PE: practical example, CE: comparative example

We claim:

1. A suspension process for producing a fluoroelastomer having copolymerized units of vinylidene fluoride monomer and at least one other copolymerizable fluorinated monomer which comprises
   (A) dispersing said monomers in an aqueous medium containing 0.001–3 parts by weight of a suspension stabilizer per 100 parts of the aqueous medium and 0.001–5 parts by weight of an oil soluble organic peroxide polymerization initiator solution per 100 parts of the aqueous medium; and
   (B) polymerizing the resultant dispersion at a temperature of 45° C.–70° C.;
wherein said oil soluble organic peroxide polymerization initiator solution consists essentially of 0.1–75 wt. % of an oil soluble organic peroxide in a water-soluble hydrocarbon solvent and said water-soluble hydrocarbon solvent contains no halogen atom and is represented by compounds of the formulas $(C_3)_3COH$, $R_2COOR_1$, and $R_1COR_3$, where $R_1$ and $R_3$ are methyl or t-butyl groups, and $R_2$ is hydrogen, a methyl group or a t-butyl group.

2. The process of claim 1 wherein the suspension polymerization is carried out in the presence of 0.005–5 parts by weight per 100 parts by weight of the aqueous medium of an iodo compound represented by the formula $RI_n$;

where R is a hydrocarbon group having 1–3 carbon atoms or saturated or unsaturated fluorohydrocarbon or chlorofluorohydrocarbon group having less than 6 carbon atoms, and n is 1 or 2.

3. The process of claim 1 wherein the fluoroelastomer produced comprises copolymerized units of vinylidene fluoride and hexafluoropropylene.

4. The process of claim 1 wherein the fluoroelastomer produced comprises copolymerized units of vinylidene fluoride, hexafluoropropylene, and tetrafluoroethylene.

5. The process of claim 1 wherein the fluoroelastomer produced comprises copolymerized units of 10–85 mol % of vinylidene fluoride, 3–80 mol % tetrafluoroethylene, and 2–50 mol % of perfluoroalkyl perfluorovinyl ether.

6. The process of claim 1 wherein the oil soluble organic peroxide is a dialkyl peroxydicarbonate.

7. The process of claim 6 wherein the oil soluble organic peroxide is diisopropyl peroxydicarbonate.

8. The process of claim 1 wherein the water-soluble solvent is a compound represented by the formula $R_1$—OH, where $R_1$ is a t-butyl group.

9. The process of claim 1 wherein the water soluble solvent is t-butyl alcohol.

10. The process of claim 1 wherein the water soluble solvent is a compound represented by the formula $R_2$—COO—$R_1$, where $R_1$ is a methyl or t-butyl group and $R_2$ is hydrogen, a methyl group or a t-butyl group.

11. The process of claim 1 wherein the water soluble organic solvent is methyl acetate.

12. The process of claim 1 wherein the water soluble organic solvent is t-butyl acetate.

13. The process of claim 1 wherein the water soluble solvent is a compound represented by the general formula $R_1$—CO—$R_3$, where $R_1$ and $R_3$ are methyl or t-butyl groups.

14. The process of claim 1 wherein the polymerization is carried out at a temperature of from 50°–60° C.

15. The process of claim 2 wherein the iodo compound is a compound represented by the formula $RI_n$, where R is a hydrocarbon group having 1–3 carbon atoms, and n is 1 or 2.

16. The process of claim 15 wherein the iodo compound is diiodomethane.

* * * * *